US008509255B2

(12) United States Patent
Chen et al.

(10) Patent No.: US 8,509,255 B2
(45) Date of Patent: Aug. 13, 2013

(54) HARDWARE PACKET PACING USING A DMA IN A PARALLEL COMPUTER

(75) Inventors: Dong Chen, Croton On Hudson, NY (US); Phillip Heidelberger, Cortlandt Manor, NY (US); Pavlos Vranas, Danville, CA (US)

(73) Assignee: International Business Machines Corporation, Armonk, NY (US)

( * ) Notice: Subject to any disclaimer, the term of this patent is extended or adjusted under 35 U.S.C. 154(b) by 1181 days.

(21) Appl. No.: 11/768,682

(22) Filed: Jun. 26, 2007

(65) Prior Publication Data

US 2009/0003203 A1 Jan. 1, 2009

(51) Int. Cl.
*H04L 12/28* (2006.01)
(52) U.S. Cl.
USPC ......... 370/413; 370/230.1; 370/231; 370/235
(58) Field of Classification Search
None
See application file for complete search history.

(56) References Cited

U.S. PATENT DOCUMENTS

| | | | |
|---|---|---|---|
| 4,777,595 A | 10/1988 | Strecker et al. | |
| 5,063,562 A * | 11/1991 | Barzilai et al. | 370/231 |
| 5,142,422 A | 8/1992 | Zook et al. | |
| 5,349,587 A | 9/1994 | Nadeau-Dostie et al. | |
| 5,353,412 A | 10/1994 | Douglas et al. | |
| 5,452,432 A | 9/1995 | Macachor | |
| 5,524,220 A | 6/1996 | Verma et al. | |
| 5,634,007 A * | 5/1997 | Calta et al. | 711/164 |
| 5,659,710 A | 8/1997 | Sherman et al. | |
| 5,708,779 A * | 1/1998 | Graziano et al. | 709/250 |
| 5,748,613 A | 5/1998 | Kilk et al. | |
| 5,761,464 A | 6/1998 | Hopkins | |
| 5,796,735 A * | 8/1998 | Miller et al. | 370/395.4 |
| 5,809,278 A | 9/1998 | Watanabe et al. | |
| 5,825,748 A * | 10/1998 | Barkey et al. | 370/236 |
| 5,890,211 A | 3/1999 | Sokolov et al. | |
| 5,917,828 A | 6/1999 | Thompson | |
| 6,023,732 A | 2/2000 | Moh et al. | |
| 6,061,511 A | 5/2000 | Marantz et al. | |
| 6,072,781 A | 6/2000 | Feeney et al. | |
| 6,122,715 A | 9/2000 | Palanca et al. | |
| 6,185,214 B1 * | 2/2001 | Schwartz et al. | 370/401 |
| 6,219,300 B1 | 4/2001 | Tamaki | |
| 6,263,397 B1 | 7/2001 | Wu et al. | |
| 6,295,571 B1 | 9/2001 | Scardamalia et al. | |
| 6,311,249 B1 | 10/2001 | Min et al. | |
| 6,324,495 B1 | 11/2001 | Steinman | |
| 6,356,106 B1 | 3/2002 | Greeff et al. | |
| 6,366,984 B1 | 4/2002 | Carmean et al. | |
| 6,442,162 B1 * | 8/2002 | O'Neill et al. | 370/389 |
| 6,466,227 B1 | 10/2002 | Pfister et al. | |

(Continued)

OTHER PUBLICATIONS

Definition of "mechanism", Oxford English Dictionary, http://dictionary.oed.com/cgi/entry/00304337?query_type=word&queryword=mechanism&first=1&max_to_show=10&sort_type=alpha&result_place=2&search_id=y2atEIGc-11603&hilite+00304337.

(Continued)

*Primary Examiner* — Jay P Patel

(74) *Attorney, Agent, or Firm* — Scully, Scott, Murphy & Presser, P.C.; Daniel P. Morris, Esq.

(57) ABSTRACT

Method and system for hardware packet pacing using a direct memory access controller in a parallel computer which, in one aspect, keeps track of a total number of bytes put on the network as a result of a remote get operation, using a hardware token counter.

16 Claims, 7 Drawing Sheets

(56) References Cited

U.S. PATENT DOCUMENTS

| | | | |
|---|---|---|---|
| 6,564,331 | B1 | 5/2003 | Joshi |
| 6,594,234 | B1* | 7/2003 | Chard et al. ............... 370/236 |
| 6,598,123 | B1 | 7/2003 | Anderson et al. |
| 6,601,144 | B1 | 7/2003 | Arimilli et al. |
| 6,631,447 | B1 | 10/2003 | Morioka et al. |
| 6,647,428 | B1 | 11/2003 | Bannai et al. |
| 6,662,305 | B1 | 12/2003 | Salmon et al. |
| 6,735,174 | B1* | 5/2004 | Hefty et al. ............... 370/235 |
| 6,775,693 | B1* | 8/2004 | Adams ............... 709/213 |
| 6,799,232 | B1 | 9/2004 | Wang |
| 6,874,054 | B2 | 3/2005 | Clayton et al. |
| 6,880,028 | B2 | 4/2005 | Kurth |
| 6,889,266 | B1 | 5/2005 | Stadler |
| 6,894,978 | B1 | 5/2005 | Hashimoto |
| 6,954,887 | B2 | 10/2005 | Wang et al. |
| 6,986,026 | B2 | 1/2006 | Roth et al. |
| 7,007,123 | B2 | 2/2006 | Golla et al. |
| 7,058,826 | B2 | 6/2006 | Fung |
| 7,065,594 | B2 | 6/2006 | Ripy et al. |
| 7,143,219 | B1 | 11/2006 | Chaudhari et al. |
| 7,191,373 | B2 | 3/2007 | Wang et al. |
| 7,239,565 | B2 | 7/2007 | Liu |
| 7,280,477 | B2* | 10/2007 | Jeffries et al. ............... 370/235 |
| 7,298,746 | B1* | 11/2007 | De La Iglesia et al. ....... 370/394 |
| 7,363,629 | B2* | 4/2008 | Springer et al. ............... 719/314 |
| 7,373,420 | B1* | 5/2008 | Lyon ............... 709/235 |
| 7,401,245 | B2 | 7/2008 | Fischer et al. |
| 7,454,640 | B1 | 11/2008 | Wong |
| 7,454,641 | B2 | 11/2008 | Connor et al. |
| 7,461,236 | B1* | 12/2008 | Wentzlaff ............... 712/10 |
| 7,463,529 | B2 | 12/2008 | Matsubara |
| 7,502,474 | B2 | 3/2009 | Kaniz et al. |
| 7,539,845 | B1 | 5/2009 | Wentzlaff et al. |
| 7,613,971 | B2 | 11/2009 | Asaka |
| 7,620,791 | B1 | 11/2009 | Wentzlaff et al. |
| 7,698,581 | B2 | 4/2010 | Oh |
| 7,898,956 | B2* | 3/2011 | Semrad et al. ............... 370/235 |
| 8,169,901 | B1* | 5/2012 | Scholte et al. ............. 370/230.1 |
| 8,194,690 | B1* | 6/2012 | Steele et al. ............... 370/412 |
| 2001/0055323 | A1 | 12/2001 | Rowett et al. |
| 2002/0078420 | A1 | 6/2002 | Roth et al. |
| 2002/0087801 | A1 | 7/2002 | Bogin et al. |
| 2002/0100020 | A1 | 7/2002 | Hunter et al. |
| 2002/0129086 | A1 | 9/2002 | Garcia-Luna-Aceves et al. |
| 2002/0138801 | A1 | 9/2002 | Wang et al. |
| 2002/0156979 | A1 | 10/2002 | Rodriguez |
| 2002/0184159 | A1 | 12/2002 | Tadayon et al. |
| 2003/0007457 | A1 | 1/2003 | Farrell et al. |
| 2003/0028749 | A1 | 2/2003 | Ishikawa et al. |
| 2003/0050714 | A1 | 3/2003 | Tymchenko |
| 2003/0050954 | A1 | 3/2003 | Tayyar et al. |
| 2003/0074616 | A1 | 4/2003 | Dorsey |
| 2003/0105799 | A1 | 6/2003 | Khan et al. |
| 2003/0163649 | A1 | 8/2003 | Kapur et al. |
| 2003/0177335 | A1 | 9/2003 | Luick |
| 2003/0188053 | A1 | 10/2003 | Tsai |
| 2003/0235202 | A1 | 12/2003 | Van Der Zee et al. |
| 2004/0003184 | A1 | 1/2004 | Safranek et al. |
| 2004/0019730 | A1 | 1/2004 | Walker et al. |
| 2004/0024925 | A1 | 2/2004 | Cypher et al. |
| 2004/0073780 | A1 | 4/2004 | Roth et al. |
| 2004/0103218 | A1 | 5/2004 | Blumrich et al. |
| 2004/0210694 | A1 | 10/2004 | Shenderovich |
| 2004/0243739 | A1* | 12/2004 | Spencer ............... 710/22 |
| 2005/0007986 | A1 | 1/2005 | Malladi et al. |
| 2005/0053057 | A1 | 3/2005 | Deneroff et al. |
| 2005/0076163 | A1 | 4/2005 | Malalur |
| 2005/0160238 | A1 | 7/2005 | Steely et al. |
| 2005/0216613 | A1 | 9/2005 | Ganapathy et al. |
| 2005/0251613 | A1 | 11/2005 | Kissell |
| 2005/0270886 | A1 | 12/2005 | Takashima |
| 2005/0273564 | A1 | 12/2005 | Lakshmanamurthy et al. |
| 2006/0050737 | A1 | 3/2006 | Hsu |
| 2006/0080513 | A1 | 4/2006 | Beukema et al. |
| 2006/0206635 | A1 | 9/2006 | Alexander et al. |
| 2006/0248367 | A1 | 11/2006 | Fischer et al. |
| 2007/0055832 | A1 | 3/2007 | Beat |
| 2007/0133536 | A1 | 6/2007 | Kim et al. |
| 2007/0168803 | A1 | 7/2007 | Wang et al. |
| 2007/0174529 | A1 | 7/2007 | Rodriguez et al. |
| 2007/0195774 | A1 | 8/2007 | Sherman et al. |

OTHER PUBLICATIONS

Almasi, et al., "MPI on BlueGene/L: Designing an Efficient General Purpose Messaging Solution for a Large Cellular System," IBM Research Report RC22851 (W037-150) Jul. 22, 2003.

Almasi, et al.,"Optimization of MPI Collective Communication on BlueGene/L Systems," ICS'05, Jun. 20-22, 2005, Boston, MA.

Gara, et al., "Overview of the Blue Gene/L system architecture," IBM J. Res. & Dev., vol. 49, No. 2/3, Mar./May 2005, pp. 195-212.

Huang, et al., "Performance Evaluation of Adaptive MPI," PPoPP'06, Mar. 29-31, 2006, New York, New York.

MPI (Message Passing Interface) standards documents, errata, and archives http://www.mpi-forum.org visited Jun. 16, 2007 (Sections 4.2, 4.4 and 10.4).

David Chaiken, Craig Fields, Kiyoshi Kurihara, Anant Agarwal, Directory-Based Cache Coherence in Large-Scale Multiprocessors, Computer, v.23 n.6, p. 49-58, Jun. 1990.

Michel, Dubois, Christoph Scheurich, Faye A. Briggs, Synchronization, Coherence, and Event Ordering in Multiprocessors, Computer, v.21 n.2, p. 9-21, Feb. 1988.

Giampapa, et al., "Blue Gene/L advanced diagnostics environment," IBM J. Res. & Dev., vol. 49, No. 2/3, Mar./May 2005, pp. 319-331.

IBM Journal of Research and Development, Special Double Issue on Blue Gene, vol. 49, Nos. 2/3, Mar./May 2005 ("Preface").

IBM Journal of Research and Development, Special Double Issue on Blue Gene, vol. 49, Nos. 2/3, Mar./May 2005 ("Intro").

"Intel 870: A Building Block for Cost-Effective, Scalable Servers", Faye Briggs, Michel et al., pp. 36-47, Mar.-Apr. 2002.

Pande, et al., Performance Evaluation and Design Trade-Offs for Network-On-Chip Interconnect Architectures, 2005, IEEE, pp. 1025-1040.

\* cited by examiner

HARDWARE PACKET PACING USING A DMA IN A PARALLEL COMPUTER

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract. No. B554331 awarded by the Department of Energy.

CROSS-REFERENCE TO RELATED APPLICATIONS

The present invention is related to the following commonly-owned, co-pending United States patent applications filed on even date herewith, the entire contents and disclosure of each of which is expressly incorporated by reference herein as if fully set forth herein. U.S. patent application Ser. No. 11/768,777, for "A SHARED PERFORMANCE MONITOR IN A MULTIPROCESSOR SYSTEM"; U.S. patent application Ser. No. 11/768,645, for "OPTIMIZED COLLECTIVES USING A DMA ON A PARALLEL COMPUTER"; U.S. patent application Ser. No. 11/768,781 for "DMA SHARED BYTE COUNTERS IN A PARALLEL COMPUTER"; U.S. patent application Ser. No. 11/768,784, for "MULTIPLE NODE REMOTE MESSAGING"; U.S. patent application Ser. No. 11/768,697, for "A METHOD AND APPARATUS OF PREFETCHING STREAMS OF VARYING PREFETCH DEPTH"; U.S. patent application Ser. No. 11/768,532, for "PROGRAMMABLE PARTITIONING FOR HIGH-PERFORMANCE COHERENCE DOMAINS IN A MULTIPROCESSOR SYSTEM"; U.S. patent application Ser. No. 11/768,857, for "METHOD AND APPARATUS FOR SINGLE-STEPPING COHERENCE EVENTS IN A MULTIPROCESSOR SYSTEM UNDER SOFTWARE CONTROL"; U.S. patent application Ser. No. 11/768,547, for "INSERTION OF COHERENCE REQUESTS FOR DEBUGGING A MULTIPROCESSOR"; U.S. patent application Ser. No. 11/768,791, for "METHOD AND APPARATUS TO DEBUG AN INTEGRATED CIRCUIT CHIP VIA SYNCHRONOUS CLOCK STOP AND SCAN"; U.S. patent application Ser. No. 11/768,795, for "DMA ENGINE FOR REPEATING COMMUNICATION PATTERNS"; U.S. patent application Ser. No. 11/768,799, for "METHOD AND APPARATUS FOR GRANTING PROCESSORS ACCESS TO A RESOURCE"; U.S. patent application Ser. No. 11/768,800, for "METHOD AND APPARATUS FOR EFFICIENTLY TRACKING QUEUE ENTRIES RELATIVE TO A TIMESTAMP"; U.S. patent application Ser. No. 11/768,572, for "BAD DATA PACKET CAPTURE DEVICE"; U.S. patent application Ser. No. 11/768,593, for "EXTENDED WRITE COMBINING USING A WRITE CONTINUATION HINT FLAG"; U.S. patent application Ser. No. 11/768,805, for "A system and method for PROGRAMMABLE BANK SELECTION FOR BANKED MEMORY SUBSYSTEMS"; U.S. patent application Ser. No. 11/768,905, for "AN ULTRASCALABLE PETAFLOP PARALLEL SUPERCOMPUTER"; U.S. patent application Ser. No. 11/768,810, for "DATA EYE MONITOR METHOD AND APPARATUS"; U.S. patent application Ser. No. 11/768,812, for "A CONFIGURABLE MEMORY SYSTEM AND METHOD FOR PROVIDING ATOMIC COUNTING OPERATIONS IN A MEMORY DEVICE"; U.S. patent application Ser. No. 11/768,559, for "ERROR CORRECTING CODE WITH CHIP KILL CAPABILITY AND POWER SAVING ENHANCEMENT"; U.S. patent application Ser. No. 11/768,552, for "STATIC POWER REDUCTION FOR MIDPOINT-TERMINATED BUSSES"; U.S. patent application Ser. No. 11/768,527 for "COMBINED GROUP ECC PROTECTION AND SUBGROUP PARITY PROTECTION"; U.S. patent application Ser. No. 11/768,669, for "A MECHANISM TO SUPPORT GENERIC COLLECTIVE COMMUNICATION ACROSS A VARIETY OF PROGRAMMING MODELS"; U.S. patent application Ser. No. 11/768,813, for "MESSAGE PASSING WITH A LIMITED NUMBER OF DMA BYTE COUNTERS"; U.S. patent application Ser. No. 11/768,619, for "ASYNCRONOUS BROADCAST FOR ORDERED DELIVERY BETWEEN COMPUTE NODES IN A PARALLEL COMPUTING SYSTEM WHERE PACKET HEADER SPACE IS LIMITED"; and U.S. patent application Ser. No. 11/768,752, for "POWER THROTTLING OF COLLECTIONS OF COMPUTING ELEMENTS".

FIELD OF THE INVENTION

The present disclosure relates generally to message passing in parallel computers, and more particularly to maintaining high performance for long messages in a parallel computing by having the DMA engine control the number of packets injected into the network, thereby preventing network buffers from filling up.

BACKGROUND OF THE INVENTION

As is well known, throughput of networks can degrade if internal network buffers fill up. Full buffers in one part of the network can prevent other packets from passing through that part of the network. Algorithms such as TCP/IP use "pacing", or window flow control algorithms, to limit the number of packets in the network; this can improve throughput. These algorithms use acknowledgement packets to grant a sender permission to send additional packets. However, the software overhead to implement such algorithms is excessive in a scientific parallel computing environment where high throughput and low latency are essential.

Thus, it is desirable to have a pacing mechanism that can be integrated into the hardware that would eliminate software overhead.

BRIEF SUMMARY OF THE INVENTION

Method and system for hardware packet pacing using a direct memory access controller in a parallel computer are provided. The method in one embodiment may comprise establishing a token counter on a direct memory access controller initially set to a first predetermined value and establishing maximum pacing submessage size, the maximum pacing submessage size being a value less than or equal to the first predetermined value. The method may further comprise establishing a remaining bytes count, the remaining bytes count initially set to a message length field value in an original remote get packet and setting a submessage size to the maximum pacing submessage size or the remaining bytes count, whichever is less. The method may also comprise waiting for the token counter to be greater than or equal to the submessage size, injecting a remote get packet of the submessage size to a network when the token counter is greater than or equal to the submessage size and decrementing the token counter and the remaining bytes count by the submessage size. The method may further comprise repeating the steps of setting, waiting and injecting until the remaining bytes count is zero.

Still yet, the method may comprise detecting a put packet received on the direct memory access controller and incrementing the token byte counter by a number of payload bytes specified in the put packet.

In another aspect, a method of hardware packet pacing using a direct memory access controller in a parallel computer may comprise detecting a remote get message descriptor in an injection fifo associated with a direct memory controller and retrieving put descriptor information from information in the remote get message descriptor. The put description information includes at least a message size, an injection offset and a reception offset. The method may also comprise setting a pacing size, setting a token counter to a predetermined value greater than the pacing size, and assembling a new remote get packet using the put description information. The new remote get packet specifies a message size that is at most the pacing size. The method may further comprise, before sending the new remote get packet, waiting until the token counter is greater than or equal to the message size specified in the new remote get packet and sending the new remote get packet. The method may still further comprise decrementing the token counter by the message size specified in the new remote get packet, and incrementing the injection offset and the reception offset by the message size specified in the new remote get packet. The method may further comprise repeating the steps of assembling, waiting, sending, decrementing and incrementing until the message size of the remote get has been processed by all the new remote get packets.

Yet in another aspect, a method of hardware packet pacing using a direct memory access controller in a parallel computer may comprise dividing a remote get packet into a plurality of sub remote get packets, tracking a hardware token counter, the hardware token counter representing a total number of bytes being processed at one time as a result of sending one or more of the sub remote get packets, and controlling the total number of bytes being processed at one time using the hardware token counter. In another aspect, the step of controlling may include controlling sending of the plurality of sub remote get packets based on the hardware token counter.

A system for hardware packet pacing using a direct memory access controller in a parallel computer having multiple processing nodes, in one aspect, may comprise a hardware token counter initially set to a predetermined positive value, a memory, and a direct memory access controller operable to detect a remote get packet in the memory. The direct memory access controller is further operable to assemble a plurality of sub remote get packets using information contained in the remote get packet, and to pace sending of said plurality of sub remote get packets based on the hardware token counter. The direct memory access controller may be further operable to increment the hardware token counter when a put packet is received and to decrement the hardware token when one of the said plurality of sub remote get packets are injected into the memory.

Further features as well as the structure and operation of various embodiments are described in detail below with reference to the accompanying drawings. In the drawings, like reference numbers indicate identical or functionally similar elements.

DETAILED DESCRIPTION

In one embodiment of the present disclosure, a pacing mechanism is provided that can be integrated into the hardware, for example, hardware of the DMA engine. Software overhead may thus be eliminated. No acknowledgement packets are required. This in one embodiment is enabled by using remote gets. In BLUEGENE™/P, there is a DMA engine that is integrated onto the same chip as the processors, cache memory, memory controller and network logic. This DMA engine injects packets from a message into the network. The system and method of the present disclosure in one embodiment use a DMA engine to control or limit the number of packets in the network without using acknowledgement packets and its accompanying complexity and overhead.

Figure 1:
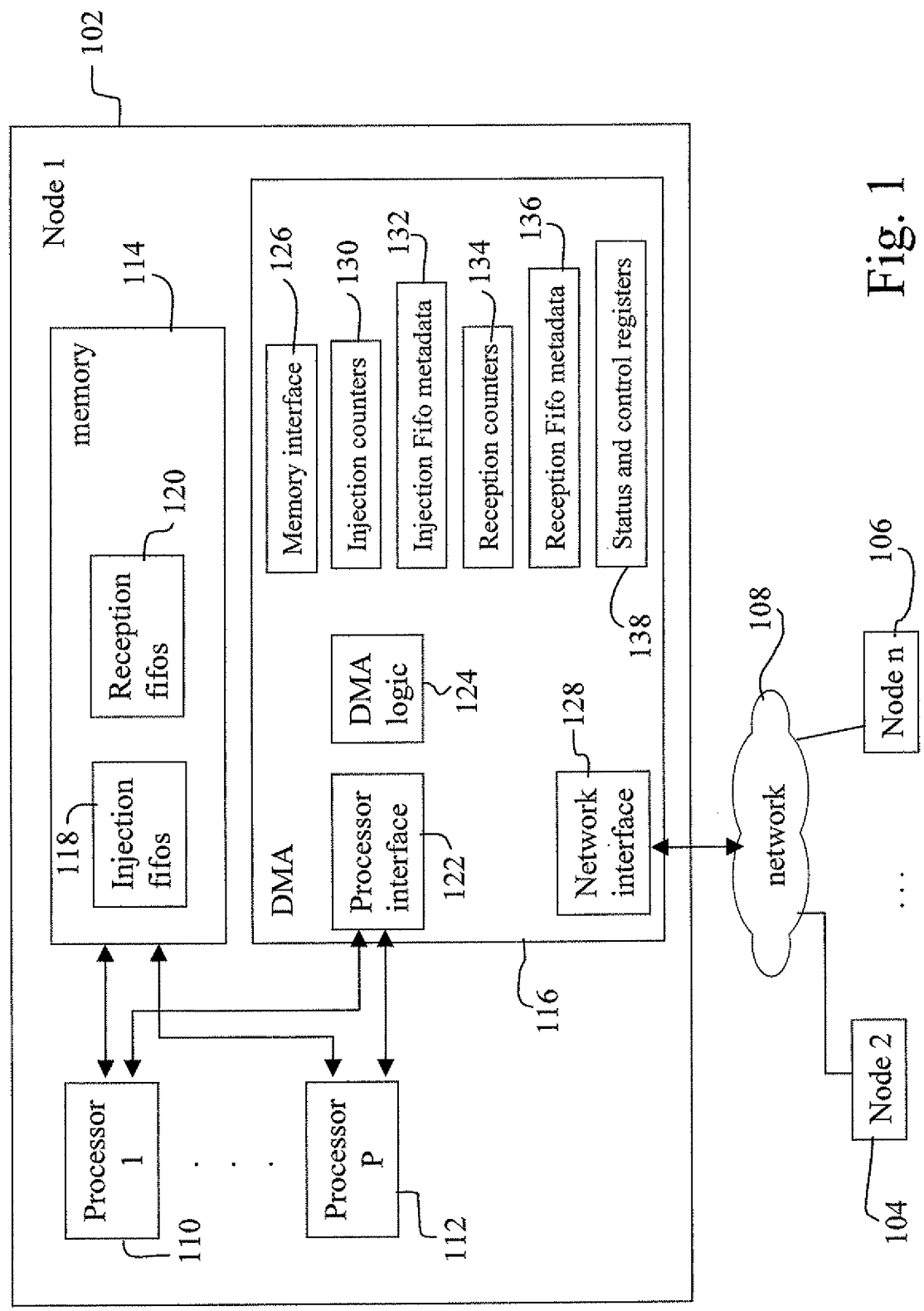
FIG. 1 illustrates an architectural diagram of a node in a parallel computer system having a DMA engine.

FIG. 1 illustrates an architectural diagram of a node in a parallel computer system having a DMA engine. A parallel computer is shown in FIG. 1 with multiple nodes 102, 104, 106 connected together by a network 108. Each node may be based on the chip process that integrates all the functions of a computer into a single compute ASIC, enabling reduction of node size and power consumption. An ASIC (application-specific integrated circuit) is a microchip designed for a special application. In a supercomputer, this can be further leveraged to increase node density thereby decreasing the overall cost and increasing performance for the machine. Each node may function as both a compute node and an I/O (input/output) node in the system, and include multiple processing cores. The processor core may be a PowerPC450 embedded core available from IBM microelectronics, although future versions of this core may be used as technology improves. A node further may incorporate other functions into the ASIC. Besides the embedded processing core and floating point cores, a node may include embedded DRAM (dynamic random access memory), an integrated external DDR2 (double-data-rate two) memory controller, DMA (direct memory access), Gb, 10 Gb Ethernet functionality as well as all the network link cut-through routing buffers and routing control block that allow any two nodes to communicate with low latency. Each core or processor (for example, 110, 112, etc.) is capable of being utilized for message handling and computation operations.

A node 102 shown in FIG. 1 includes multiple processors or cores 110 . . . 112, a memory 114 and a DMA 116. The memory 114 may be DRAM, SDRAM or any other memory. The DMA 116 includes a processor interface 122, DMA logic 124, a memory interface 126, and a network interface 128, Injection Counters 130, Injection Fifo Metadata 132, Reception Counters 134, Reception Fifo Metadata 136 and status and control registers 138. The Injection Fifo metadata 132 describes where in memory 114 the Injection Fifos 118 are located and the current head and tail of the Fifos 118. The Reception Fifo metadata 136 describes where in memory 114 the Reception Fifos 120 are located and the current head and tail of the Fifos 120. Thus, DMA has pointers to the fifos in memory 114, for example, by means of a reception fifo metadata 136 and injection fifo metadata 132. Injection fifos 118 in memory store message descriptors associated with message packets for injection to the network, and reception Fifos 120 in memory store packets received from the network. Memory interface 126 is used to read and write data to the memory 114 from the DMA 116. For example, DMA logic 124 may update injection fifos 118 and reception fifos 120 via the memory interface 126. One or more processors 110, 112 on the node 102 communicate with DMA 116 via a processor interface 122. The control registers 138 are used to properly configure the DMA 116. The status registers 138 reflect the current status, such as error conditions of the DMA 116 or which counters have hit zero.

Figure 2:
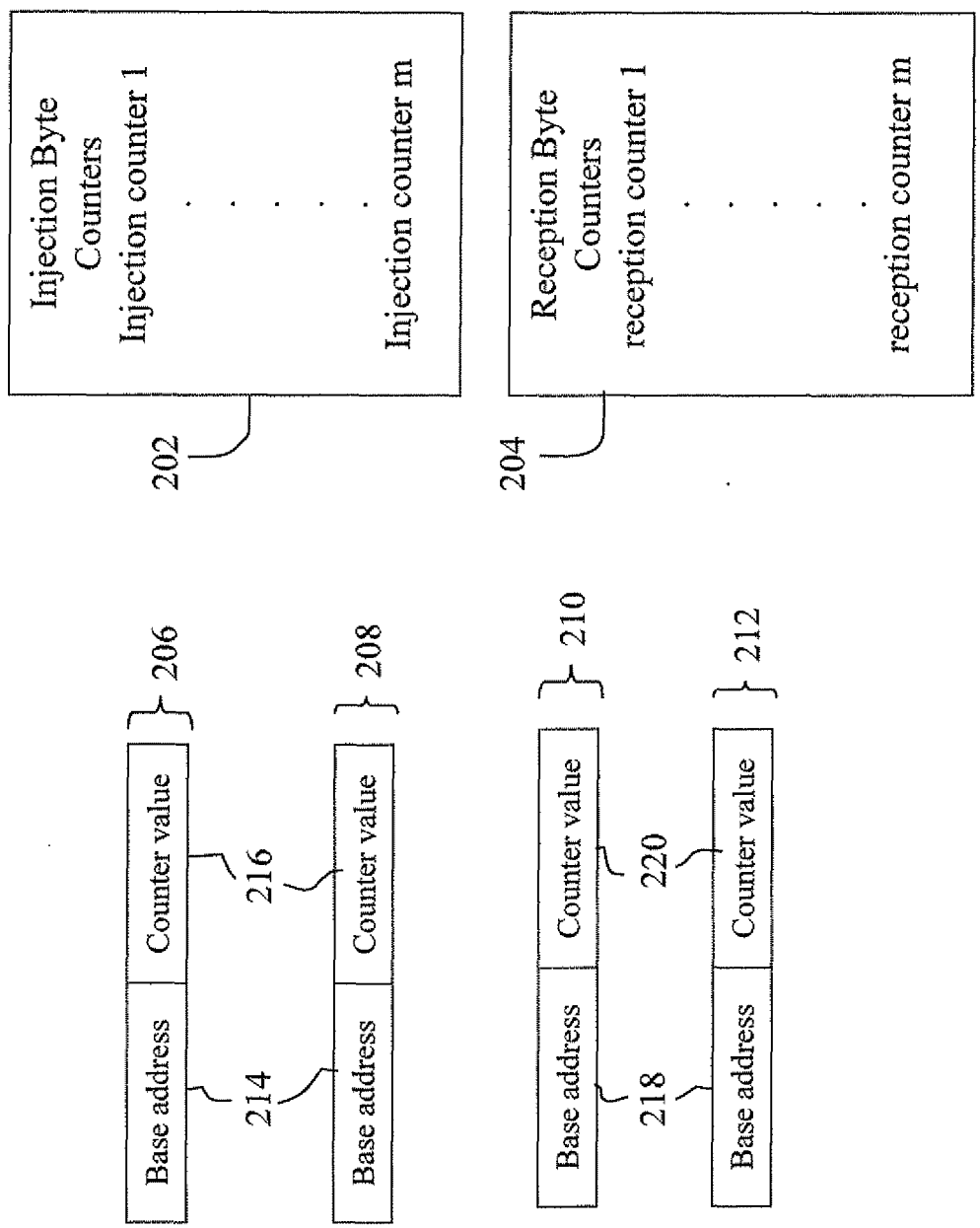
FIG. 2 illustrates DMA injection and reception counter structure in one embodiment.

FIG. 2 shows multiple injection counters 1 to m 202 and multiple reception counters 1 to m 204. Each injection counter (206, 208, etc.) includes a base address 214 and a byte counter value 216. Each reception counter (210, 212, etc.) includes a base address 218 and a byte counter value 220. Injection counters and reception counters are identified using counter identifiers (ids).

For long messages implemented as puts, sending and receiving nodes agree on which injection counter 130 and reception 134 counter to use, and what base offset from memory location to use for a message being processed. Such agreements may be reached by sending a protocol message(s) in which a short memory Fifo message is put into reception FIFOs of a receiving node such as shown at 120. In another embodiment, software can be constructed so that the counter ids and offsets can be agreed upon without sending protocol messages. Long message transfer may be initiated, for example, as a core processor on the sending node places a "put" message descriptor into an injection FIFO 118, writing the injection counter 130 with base address and counter value via the processor interface 122, and updating the injection FIFO metadata 132 for that message, for instance, advancing a tail pointer indicating the "last" message descriptor in the injection FIFO 118. DMA logic 124 reads the injection FIFO metadata 132 and recognizes which FIFOs 118 have messages to be sent.

Figure 3:
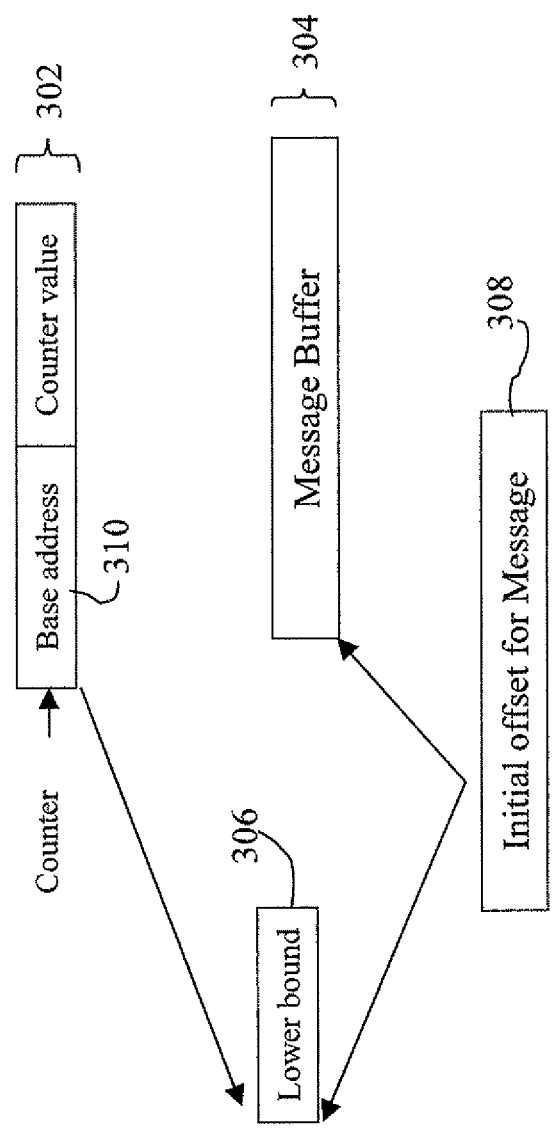
FIG. 3 illustrates relationship of the counter base address to the message buffer and the initial offset in a message descriptor.

FIG. 3 shows the relationship between a counter 302 and the message buffer 304 to be sent and/or received. The counter base address 310 is set to a value which is a lower bound 306 on the address of the message buffer 304. The initial message offset 308 specified in the message descriptor is the starting address of the message buffer minus the base address 310 of the counter 302.

The system and method of the present disclosure in one embodiment utilizes types of messages such as remote gets and direct puts or the like. Short memory Fifo messages are used to convey control information between nodes.

Figure 4A:
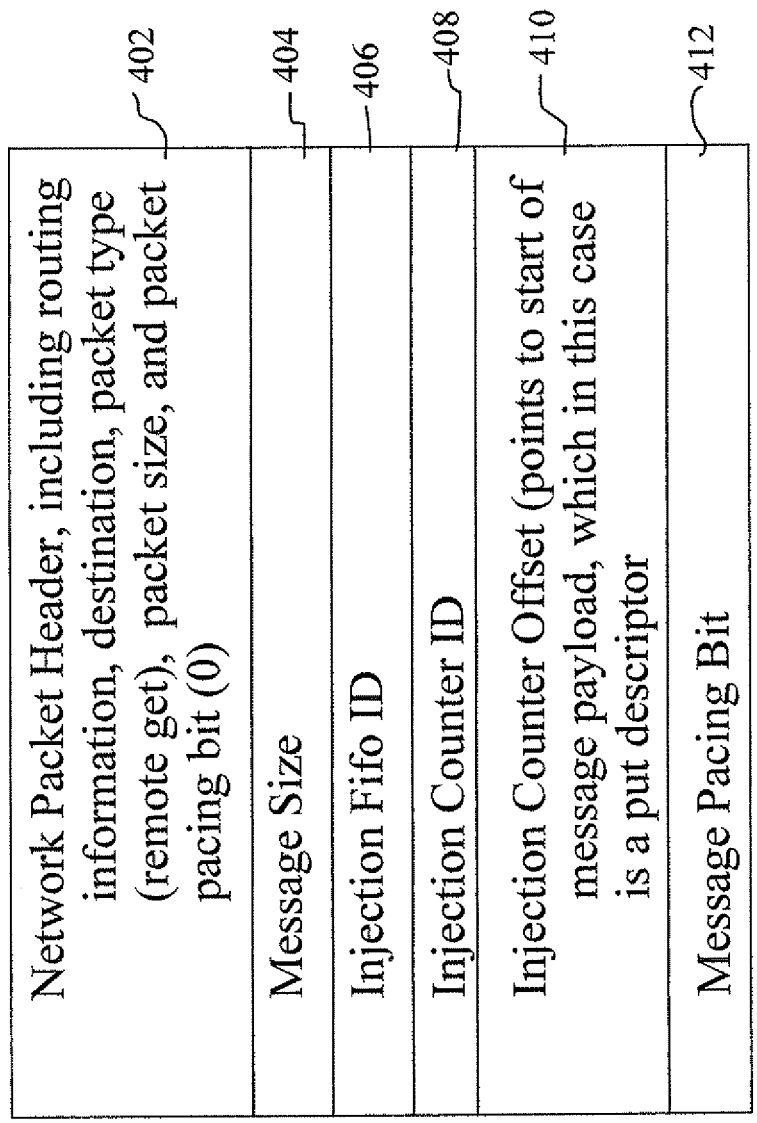
FIG. 4A illustrates a plurality of fields for remote get messages used in the present disclosure in one embodiment.

FIG. 4A illustrates a plurality of fields for remote get message descriptors used in the present disclosure in one embodiment. The network packet header 402 may include network routing information, the address of the destination node, the packet type (a remote get), packet size and a packet pacing bit (set to 0), etc. The message size field 404 has the message length. The injection Fifo id 406 specifies into which injection Fifo on the destination node the payload of the resulting remote get packet corresponding to this message should be placed; the remote get payload is a put descriptor. Briefly, payload refers to data of the message packet that is not overhead information such as header or control information. The injection counter id field 408 includes an identifier for the injection counter. The injection counter offset field 410 includes a pointer or address that points to start of message payload, which in this case may be a put descriptor. The DMA uses the injection counter identifier and the offset specified in those fields to determine the location of the payload of this message. The location is the base address of the specified counter plus the offset in the descriptor. The message pacing bit 412 specifies whether or not this remote get is subject to pacing.

Figure 4B:
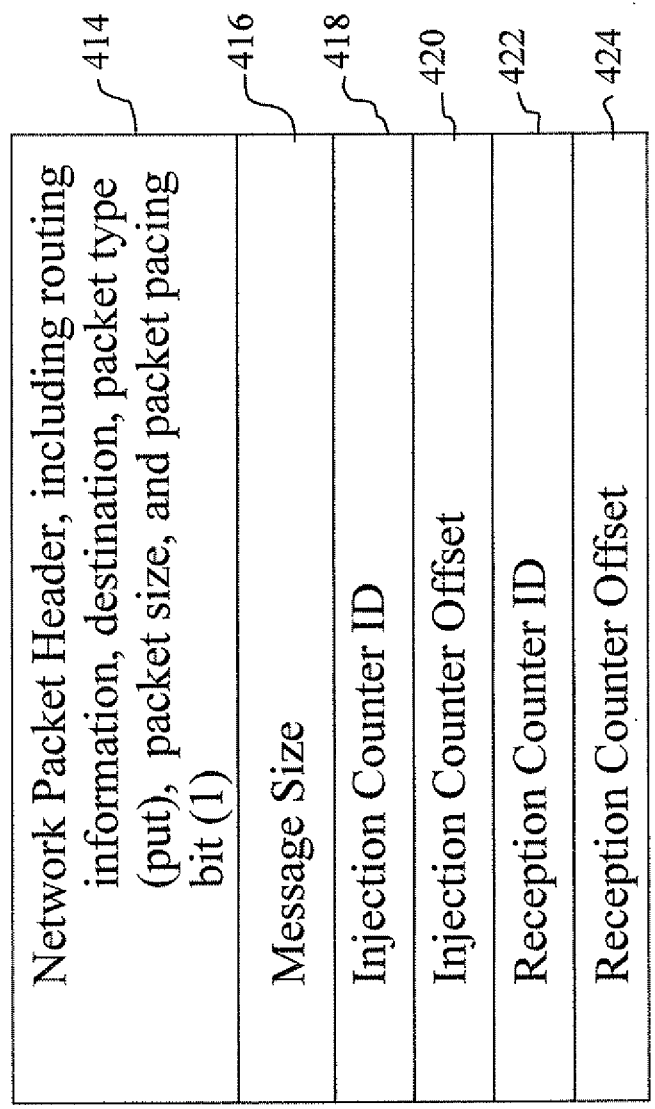
FIG. 4B illustrates a plurality of fields for a put descriptor used in the present disclosure in one embodiment.

FIG. 4B illustrates a plurality of fields for a put descriptor used in the present disclosure in one embodiment. The network packet header 414 may include network routing information, the address of the destination node, the packet type (a put), packet size and a packet pacing bit, etc. The pacing bit should be set to 1 if the put is subject to pacing, otherwise to 0. The message size field 416 specifies the length of the message, the injection counter id field 418 specifies an identifier for the injection counter being used, and the offset field 420 specifies the offset from the memory location pointed to by the base address in the specified injection counter. Data is sent from the specified injection counter's base address plus the offset. The reception counter id field 422 specifies the identifier of a reception counter in the destination node, and the offset field 424 specifies an offset from the memory location of the base address in the reception counter. The message is to be placed in memory on the destination node starting at the specified reception counter's base address plus the offset specified in the offset field 424.

Referring to FIG. 1, normally without pacing, when a DMA logic detects a non-empty injection Fifo, the DMA logic causes the memory interface 126 to read the descriptor at the head of the Injection FIFO 118. Assuming the message descriptor specifies a put message, the descriptor includes the injection (130) and reception counter (134) identifications to be used, the message length, the initial injection and reception offsets of the message, the destination node and other network routing information. The DMA 116 retrieves the message from the location in memory specified by the base address read from the injection counter 130 and offset, and assembles it into packets to be "put" on to the network 108. DMA 116 assembles the packet including the message and the information regarding an offset from the base address specified in the reception counter 134 where the data from this packet is to be stored at the receiving node, and a count of how many payload bytes in this packet should be written. DMA 116 updates this information correctly for each packet, and puts the packets into the network interface 128. The packet enters the network and is routed to another node, for instance, the destination compute node.

After DMA 116 puts the packet in the network interface 128, it decrements the counter valued of the specified injection counter 130 by the number of payload bytes in the packet. Upon reaching the destination, the packet is put into the network interface at that compute node (e.g., 104 or 106), and the node's local DMA "recognizes" that the packet is there. Without pacing, for a put packet, the receiving node's DMA reads the reception counter identifier, offset and count from the received packet, looks up the reception counter base address, writes the appropriate number of payload bytes specified in the packet starting at the base plus packet offset, and then decrements the counter value by the payload bytes received.

In one embodiment of the present disclosure, the DMA implements a remote get capability. With remote get, one node (e.g., 104) can inject a short remote get packet into the network destined for another node (e.g., 102) telling node at 102 to send M bytes of data back to node at 104. Thus, if a remote get operation is used, instead of the processor on the sending node injecting a descriptor into the injection fifo 118, the receiving node 104 sends a short get packet, which contains a put descriptor to the sender node and an injection Fifo id on the sender node. Without pacing, the DMA logic 124 at the sender node 102 puts this descriptor into the injection Fifo 118 specified in the short get message, and advances that Fifo's metadata tail pointer 132. As described in more detail in the co-owned patent application entitled MULTIPLE NODE REMOTE MESSAGING U.S. patent application Ser. No. 11/768,784, the payload of this remote get packet is a DMA descriptor that is deposited into an injection fifo 118 on node at 102. This descriptor may be a "put" descriptor that contains information such as the starting address of the buffer to be sent on node at 102 and the starting address of the buffer on node 104 into which the data is to be stored, the injection and reception counter ids to use and the initial offsets from the base addresses of the counter ids. For a long message, a single remote get results in single put message, or a single memory Fifo message, which in turn injects a large number of packets into the network with no flow control. Note that a single remote get, as specified in a message descriptor, results in a single remote get packet being injected into the network.

The above-described operations may be modified to implement pacing to control the packet injection rate of long messages. Pacing is implemented in one embodiment using remote gets with a message pacing option. With pacing, a single remote get for a long message is broken up into many remote gets for shorter submessages. A limit may be set on the number of outstanding bytes that may be requested from the node. This may be represented by a counter maintained in the DMA. The counter herein is referred to as a token_byte counter as an example. Any other name may be given to such counter or an element that provides the similar functionality. The shorter remote gets can only be injected into the network if the current number of outstanding bytes is low enough. When a shorter remote get is injected into the network, the token_byte counter is decremented by the submessage size. For such pacing messages, the resulting put packets contain a packet pacing bit set to 1. The token_byte counter is initialized to an arbitrary positive number, prior to a DMA activity.

Figure 5:
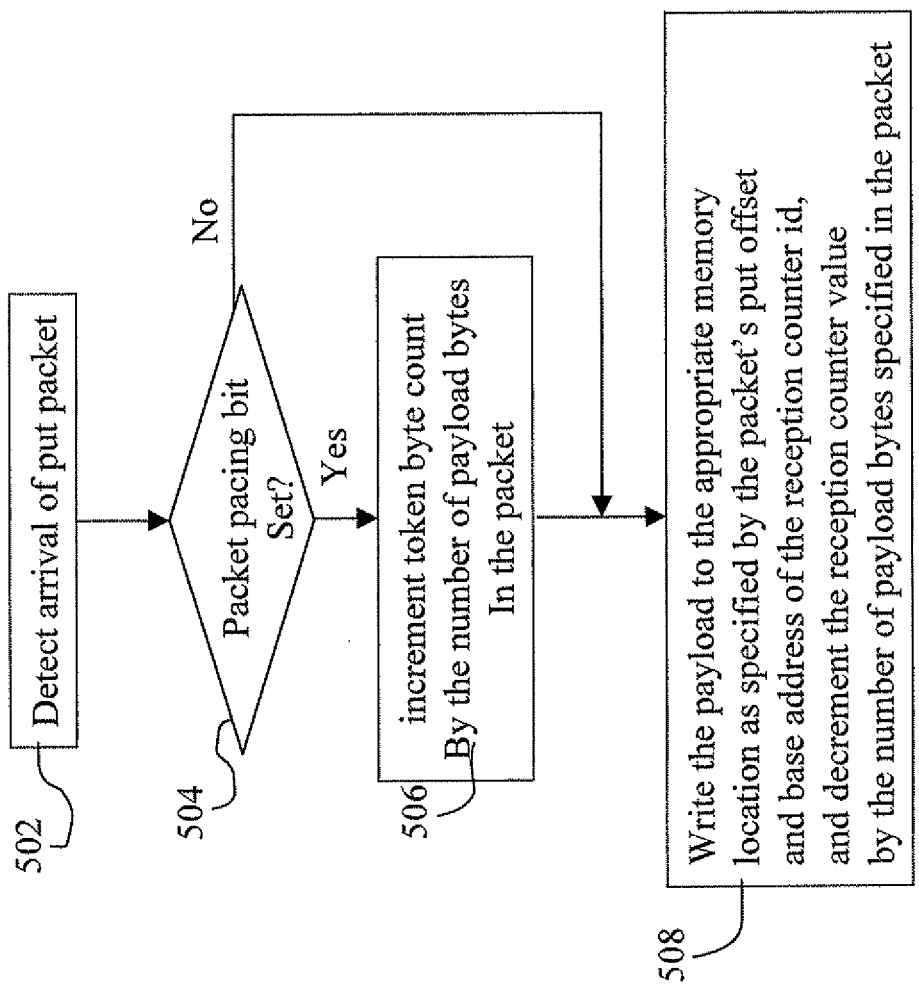
FIG. 5 illustrates the steps taken by a DMA in one embodiment when it receives a put packet.

FIG. 5 illustrates the steps taken by a DMA in one embodiment when it receives a put packet, that is, when the DMA that sent a remote get receives a message packet in response to that remote get operation. At 502, a node detects arrival of a put packet. At decision 504, a determination is made. If the pacing bit in the packet is 1 ("yes"), the token_byte counter is increased by the number of payload bytes in the packet at 506. If the pacing bit in the packet is 0 ("no"), the steps proceed to 508. At 508, as is done normally with a put packet, the payload of the packet is written to the correct memory location as specified by the reception counter id and the packet's put offset. That is, the data is written starting at the base address specified in the counter plus the put offset. The reception byte counter value is decremented by the number of payload bytes in the packet.

Prior to any DMA activity, the token_byte counter is initialized to an arbitrary positive number, for example, token_byte_max. In addition, a maximum pacing submessage size, max_size, is initialized to an arbitrary positive number less than or equal to the token_byte counter's initial value, token_byte_max.

Figure 6:
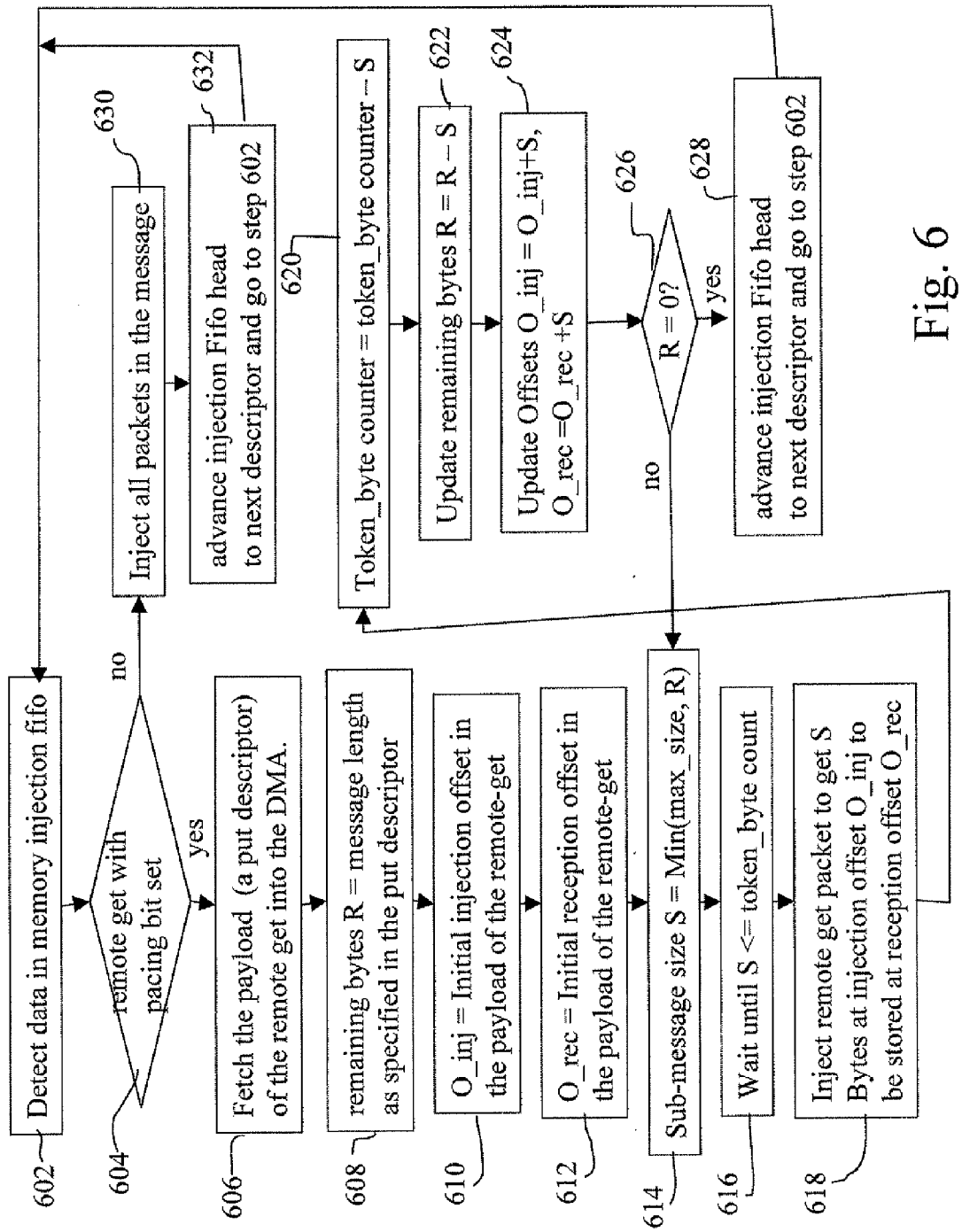
FIG. 6 illustrates the DMA logic for injecting messages from a DMA injection FIFO into the network in one embodiment.

FIG. 6 illustrates the DMA logic for injecting messages from a DMA injection FIFO into the network in one embodiment. At 602, the DMA waits until an injection Fifo is non-empty, that is, detects that there is a message to send. At 604, the DMA starts processing the message descriptor at the beginning of the Fifo. If the descriptor message pacing bit is 0, or if the message type is not a remote get, the packets in the message are injected into the network at 630. After all the packets of such a message are injected into the network, the injection Fifo head pointer is updated to point to the next descriptor at 632, if any, and the logic returns to step 602. Otherwise, at 604, the logic proceeds to step 606 for a remote get with message descriptor pacing bit=1. At 606, the payload of the remote get is fetched from memory. This payload is a direct put descriptor (FIG. 4B) that for example specifies a network packet header, a message length, initial injection and reception offsets, and injection and reception counter ids. The packet header should specify that the put is being sent back to this node. At 608, the remaining bytes parameter, R, in the message is set to the message length just fetched, that is, the value of the message size field (FIG. 4B, 416) in the direct put descriptor. At 610, parameter O_inj is set to the initial injection offset specified in the payload and at 612, parameter O_rec is set to the initial reception offset specified in the payload. These values are stored in the DMA in one embodiment. O_inj is the injection offset for the put of the submessage triggered by the remote get and O_rec is the reception offset for the put of the submessage triggered by the remote get. At 614, the submessage size S is set to the minimum of max_size and R. The parameter "max_size" represents maximum length of the submessage. At 616, the DMA waits until S<=token_byte counter. This indicates that the number of outstanding bytes subject to pacing in the network is less than token_byte_max, that is, maximum number of bytes allowed at one time. Eventually, this condition will be satisfied because token_byte counter gets incremented when pacing put packets return to this node. When the condition at 616 is satisfied a remote get packet is injected into the network specifying a submessage size of S, injection and reception offsets O_inj and O_rec at 618. Otherwise the payload of the remote get is unchanged from its initial value. This remote get will cause a put message of length S to be sent back to this node at the correct initial offsets. At 620, the token_byte counter is decremented by S. At 622, the remaining bytes for the message is decremented by S (R=R−S). This value of R is stored in the DMA. At 624, the injection and reception offsets are incremented by S (O_inj=O_inj+S and O_rec=O_rec+S). At 626, if R=0, then the remote get for all submessages have been issued, so the injection Fifo head pointer is updated to point to the next descriptor at 628, if any, and the logic returns to step 602. Otherwise, the logic proceeds to step 614 to process the remaining bytes in the original remote get message.

In one embodiment, the number of outstanding bytes of pacing put messages in the network is less than or equal to token_byte_max at all times. Since long messages typically have a fixed packet length equal to the maximum packet size, this limits the number of pacing put packets in the network. However, the number of messages (packets) not subject to pacing is not limited in this way and could grow until all the buffers in the network are full, or nearly full. In one embodiment, software in an arbitrary manner may decide which messages, if any, are subject to pacing. This may be determined by experimentation.

Different implementations for hardware pacing are possible. For example, there may be multiple injection Fifos. The description above would then be modified in such a way that the DMA switches between non-empty injection Fifos. In particular, on such a switch, the method is applied to each injection Fifo, however, maintaining the condition that a remote get for a pacing submessage cannot be issued until the check in step 616 is satisfied.

In another embodiment, there may be multiple token_byte counters. Suppose there are k such counters token_byte_counter(1), ..., token_byte_counter(k) and multiple max submessage sizes max_size(1), ..., max_size(k). In one aspect of this embodiment, there may be a control register in the DMA specifying for each injection Fifo, which token_byte_counter(i) should be used for all remote gets using that Fifo. All max_sizes, that is 1 to k may be initialized to a positive value and the max_size(i) is less than the corresponding initial value of token_byte_counter(i). In another aspect of this embodiment, the remote get message descriptor may include the index id i specifying token_byte_count(i) and max_size(i) to be used. In both aspects of the embodiment, step 614 becomes S min (max_size(i), R) and step 316 becomes wait until S<=token_byte_count(i). In addition, the resulting put packets may also specify the index i so that the correct token_byte counter is incremented when the put packets return to the node.

Yet in another embodiment, it may be left up to the software to divide the remote get into sub remote gets and assemble the sub remote get packets. In this embodiment, hardware paces the sub remote get packets by monitoring the token_byte counter and sends a sub remote get when the token_byte counter is greater than equal to message length specified in the put descriptor of the sub remote get. The hardware increments the token_byte counter when a put packet is received and decrements the token_byte counter when a sub remote get packet is sent.

The embodiments described above are illustrative examples and it should not be construed that the present invention is limited to these particular embodiments. For example, while some of the memory structure were shown and described in terms of fifo, any other queuing or structuring mechanism may be used. Thus, various changes and modifications may be effected by one skilled in the art without departing from the spirit or scope of the invention as defined in the appended claims.

We claim:

1. A method of hardware packet pacing using a direct memory access controller in a multi-node parallel computer, comprising:
   establishing in a first node a token counter on a direct memory access controller initially set to a first predetermined value;
   establishing in the first node maximum pacing submessage size, the maximum pacing submessage size being a value less than or equal to the first predetermined value;
   establishing in the first node a remaining bytes count, the remaining bytes count initially set to a message length field value in an original remote get packet;
   setting in the first node a submessage size to the maximum pacing submessage size or the remaining bytes count, whichever is less;
   waiting in the first node for the token counter to be greater than or equal to the submessage size;
   injecting a remote get packet of the submessage size to a network of at least one or more other nodes when the token counter is greater than or equal to the submessage size and decrementing the token counter and the remaining bytes count by the submessage size; and
   repeating the steps of setting, waiting and injecting until the remaining bytes count is zero.

2. The method of claim 1, further including:
   detecting a put packet received on the direct memory access controller; and
   incrementing the token byte counter by a number of payload bytes specified in the put packet.

3. The method of claim 1, wherein the step of injecting a remote get packet of the submessage size further includes assembling the remote get packet to include a put descriptor having a message size field set to the submessage size.

4. The method of claim 3, wherein the step of injecting a remote get packet of the submessage size further includes updating offsets of the remote get packet to offset plus the submessage size.

5. The method of claim 1, further including:
   the direct memory access controller detecting a message descriptor associated with the original remote get in an injection fifo.

6. The method of claim 5, further including:
   reading a pacing bit in the message descriptor associated with the original remote get message descriptor; and
   performing the steps of claim 1 if the pacing bit is set.

7. The method of claim 1, further including:
   the direct memory access controller detecting a plurality of original remote get message descriptors from a plurality of injection fifos; and
   performing the steps of claim 1 for the plurality of original remote get packets.

8. The method of claim 1, wherein the maximum pacing submessage size is specified in the message descriptor of the original remote get message descriptor.

9. The method of claim 1, further including:
   establishing a plurality of token counters; and
   assigning each of the plurality of token counters to a different injection fifo in memory, wherein the direct memory access controller uses a token counter assigned to an injection fifo in which the original remote get packet is injected.

10. The method of claim 1, further including:
    establishing a plurality of token counters; and
    using a selected token counter.

11. The method of claim 10, wherein the selected token counter is specified in the message descriptor of the original remote get.

12. The method of claim 10, wherein further including:
    establishing a plurality of maximum pacing submessage sizes; and
    specifying in a message descriptor of the original remote get which one of the plurality of maximum pacing submessage sizes to use.

13. The method of claim 10, wherein a register in the direct memory access controller specifies the selected token counter to use for a message descriptor associated with the original remote get based on an injection fifo in which the message descriptor associated with the original remote get is injected.

14. The method of claim 10, further including:
    detecting a put packet received on the direct memory access controller;
    determining from the put packet a token counter to use from the plurality of token counters; and
    incrementing the determined token counter by a message length specified in the put packet.

15. A method of hardware packet pacing using a direct memory access controller in a multi-node parallel computer, comprising:
    detecting in a first node a remote get message descriptor in an injection fifo associated with a direct memory controller;
    retrieving in the first node put descriptor information from information specified in the remote get message descriptor, the put description information including at least a message size, an injection offset, a reception offset, an injection counter identifier and a reception counter identifier;

setting in the first node a pacing submessage size;

setting in the first node a token counter to a predetermined value greater than the pacing size;

assembling in the first node a new remote get packet using the put description information, the new remote get packet specifying a message size that is at most the pacing size;

before sending the new remote get packet, waiting in the first node until the token counter is greater than or equal to the message size specified in the new remote get packet;

sending the new remote get packet to at least one or more other nodes;

decrementing in the first node the token counter by the message size specified in the new remote get packet; and incrementing in the first node the injection offset and the reception offset by the message size specified in the new remote get packet; and repeating the steps of assembling, waiting, sending, decrementing and incrementing until the message size of the remote get has been processed by all the new remote get packets.

16. The method of claim 15, further including:

detecting a put packet; and incrementing the token counter by a number of payload bytes specified in the put packet.

* * * * *